(12) United States Patent
Horst-Udo

(10) Patent No.: US 6,358,447 B1
(45) Date of Patent: Mar. 19, 2002

(54) PROCESS FOR THE PRODUCTION OF A POSITIVE ELECTRODE FOR AN ALKALINE PRIMARY ELEMENT

(75) Inventor: Jose Horst-Udo, Ellwangen (DE)

(73) Assignee: Varta Geratebatterie GmbH (DE)

( * ) Notice: Subject to any disclaimer, the term of this patent is extended or adjusted under 35 U.S.C. 154(b) by 0 days.

(21) Appl. No.: 09/429,809

(22) Filed: Oct. 29, 1999

(30) Foreign Application Priority Data

Nov. 2, 1998 (DE) .......................... 198 50 474

(51) Int. Cl.$^7$ .......................... B29C 59/02; B29C 67/02; B29C 69/02
(52) U.S. Cl. .................. 264/105; 264/118; 264/119; 264/122; 264/128; 264/319
(58) Field of Search ................ 264/104, 105, 264/118, 122, 128, 299, 308, 309, 319, 119, 125

(56) References Cited

U.S. PATENT DOCUMENTS

| | | | | |
|---|---|---|---|---|
| 3,071,814 A | * | 1/1963 | Guggenheim | ............... 264/319 |
| 3,306,781 A | | 2/1967 | Siller | |
| 3,737,276 A | * | 6/1973 | Hill et al. | ................... 264/119 |
| 4,160,747 A | * | 7/1979 | Schneider et al. | ........... 252/506 |
| 4,320,184 A | * | 3/1982 | Bernstein et al. | ............ 264/105 |
| 4,320,185 A | * | 3/1982 | Bernstein et al. | ............ 264/105 |
| 5,047,283 A | * | 9/1991 | Leatherman et al. | ........ 428/209 |
| 5,136,371 A | | 8/1992 | Savatier et al. | |
| 5,435,874 A | * | 7/1995 | Takeuchi et al. | ............. 264/104 |
| 5,589,129 A | * | 12/1996 | Kato et al. | ................... 264/437 |
| 5,698,147 A | * | 12/1997 | Chern et al. | ................. 264/105 |
| 5,882,570 A | * | 3/1999 | Hayward | ................ 264/328.18 |
| 6,010,653 A | * | 1/2000 | Menon | ..................... 156/308.6 |

FOREIGN PATENT DOCUMENTS

| | | |
|---|---|---|
| DE | 1228685 | 6/1963 |
| DE | 23 54 023 | 10/1973 |
| JP | 53 124922 | 10/1978 |
| JP | 56 038200 | 3/1981 |
| JP | 03 063240 | 3/1991 |

* cited by examiner

*Primary Examiner*—Angela Ortiz
(74) *Attorney, Agent, or Firm*—Schnader Harrison Segal & Lewis LLP

(57) ABSTRACT

The invention relates to a process for producing a positive electrode, containing an organic polymer as binder, for primary elements with alkaline electrolytes. The process according to the invention is carried out in the following way: manganese dioxide particles are mixed with a graphite dispersion, which contains an organic polymer, and are compressed to form an electrode body.

11 Claims, No Drawings

PROCESS FOR THE PRODUCTION OF A POSITIVE ELECTRODE FOR AN ALKALINE PRIMARY ELEMENT

FIELD OF THE INVENTION

The invention relates to a process for producing a positive electrode, containing an organic polymer as a binder, for primary elements with alkaline electrolytes.

BACKGROUND OF THE INVENTION

The electrode mass for the positive electrode is compressed to form cylindrical shaped parts for the production of alkaline primary elements of the mass type. The main constituents of the electrode mass are manganese dioxide and a highly conductive graphite which improves the electronic conductivity of the electrode. Many producers add 4 to 8% by weight of aqueous potassium hydroxide solution (KOH) to the electrode mass for the positive electrode of alkaline primary elements. Molded articles produced from this mixture using commercially available machines need, in addition to the electrochemical requirements, to meet minimum requirements in terms of dimensional stability and mechanical strength to guarantee that they can be processed without problems in mass production. A binder is often added to the electrode mass for this purpose. Although adding amounts of KOH solution does lead to adhesive consolidation of the particles of the mass, it also causes a disproportionately high degree of wear on the pressing tools as well.

The literature discloses a number of polymeric binders, which are added to the electrode mass as dry powders, solutions in organic solvents or as dispersions. DE-A 1228685 discloses the use of a polyisobutylene solution as a binder in the electrode mass. DE-A 2354023 discloses the use of an aqueous polyisobutylene dispersion as a binder for the electrode mass of an alkaline primary element. JP-A 55050577 or JP-A 57152674 discloses the use of polytetrafluoroethylene, polyethylene or poly-styrene or salts of polyacrylic acid as binders for that purpose. Further, JP-A 04296449 discloses the use of a mixture of hydrophobic and hydophilic binders for the production of cathode bodies of alkaline primary elements.

In the case of adding organic binders to solutions, manganese dioxide and graphite particles are coated with a skin of the binder, which besides an electronic insulation effect, leads to the cathode body having hydrophobicity which is undesirable for the electrochemical release of energy. It is harder for the electrolyte to penetrate and wet the manganese dioxide particles because of this.

In the case of using dry binders in powder form, a skin-like coating on the particles contained in the electrode mass is not formed. However, even with prolonged mixing, irregular distribution of the binder and widely differing hydrophobic and hydrophilic regions in the cathode bodies are found. In particular, known binders have a tendency to fill the gaps between the electrochemically active particles in the finished electrode. The result of this is to increase the inner resistance of the cells.

Accordingly, an object of the invention is to provide a method with which it is possible to obtain positive electrode bodies that have sufficient strength and, in particular, when loaded with high currents, show an improvement in capacity.

SUMMARY OF THE INVENTION

The invention includes a process for producing a positive electrode, containing an organic polymer as binder, for primary elements with alkaline electrolytes, wherein manganese dioxide particles are mixed with a graphite dispersion, which contains an organic polymer, and are compressed to form an electrode body.

DETAILED DESCRIPTION OF THE INVENTION

It will be appreciated that the following description is intended to refer to specific embodiments selected for illustration in the Examples and is not intended to define or limit the invention, other than in the appended claims.

According to the invention, the object is achieved by a process wherein manganese dioxide particles are mixed with a graphite dispersion, which contains an organic polymer, and is compressed to form an electrode body. Advantageously, the average particle size of the graphite in the graphite dispersion is less than about 10 μm.

In a further refinement of the invention, the graphite dispersion used contains about 10 to 50% by weight graphite and about 5 to 35% by weight of an organic polymer, the remainder being a dispersion medium. In particular, the organic polymer is an amphiphilic copolymer which is selected from vinyl acetate copolymers. Of the vinyl acetate copolymers at least two groups are preferred. Examples include ethylene-vinyl acetate copolymers (E/VA) and vinyl chloride-vinyl acetate copolymers (VC/VAC) (The "slash" indicates that a copolymerizate is involved.). Generally, E/VA is considered to be an elastomer, the general structural formula of E/VA being:

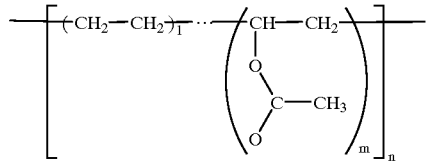

An especially preferred E/VA is poly(1-acetoxyethylene-co-ethylene) or more precisely poly(ethylene-co-vinyl acetate). The properties vary depending on the length of "1" and "m" and on the number of sequences (designated as "n" above). The number for 1, m and n is at least 1.

The general structural formula of VC/VAC is:

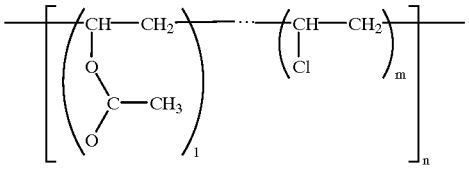

VC/VAC is considered to be an amorphous thermoplastic. An especially preferred VC/VAC is poly(1-acetoxyethylene-co-chloroethylene) or poly(vinyl acetate-co-vinyl chloride). With respect to E/VA, the monomer content of ethylene (E) may range from about 28 to 72%, the monomer content of the vinyl acetate (VA) accordingly from about 72 to 28%. A VA monomer content of <50% is preferred since the latter produces more plastic binders.

It is also possible that the E/VA is partly cross-linked (e.g., with peroxide) in order to increase certain elastic properties of the binder. With respect to VC/VAC, the monomer content of vinyl acetate here is preferably in the range of about 5 to 20%. Furthermore, when necessary to increase metal affinity, monomer contents with about 5–10% maleic acid may be mixed in. The binders of this group may be added in smaller quantities because of their extremely soft, plastic properties, and are therefore preferred over those of the E/VA group.

An aqueous graphite dispersion is used for producing the electrode bodies, preferably about 0.5 to 3% by weight of the aqueous dispersion. Specifically, the electrode bodies are produced by mixing electrochemically purified (electrolytic) manganese dioxide (EMD) with the graphite under substantially dry conditions. The dry graphite dispersion is then injected or slowly poured into the running mixer. After a further mixing time, aqueous KOH solution is also admixed and homogenized, when appropriate.

It is also possible to add the two liquid components (graphite dispersion, KOH solution) by premixing them in the appropriate quantity ratio and then dosing them together to the dry mixture. An even better distribution of the graphite dispersion can then be obtained, depending on the mixer system employed.

The electrode mixture described above for the cathode is then rolled between compactor rolls to form a solid strip and, following this, comminuted in a granulating process to reduce it to the desired grain fraction.

The flowable "grainy" cathode mass thus produced is then compressed, for example in rotary presses, to form cathode rings or tablets in sizes depending on the type of cell.

The electrodes thus produced can in this way be processed for further insertion into the appropriate cell container. The mechanical stability of the positive electrodes prepared in this way is, with an appropriate compressed density of, for example, about 3.1–3.2 g/cm$^3$, high enough for them to be fitted in the cell containers without damage via conveyors.

The electrode bodies produced can be used in the known way, for example to produce primary galvanic cells, by fitting them in a cell receptacle into which further KOH electrolyte (soaking electrolyte) and a zinc electrode (anode gel) are subsequently dosed with the interposition of a separator.

Unexpectedly, the electrodes produced according to the invention show outstanding load capacity in galvanic elements. Particular emphasis should be placed on the advantages in the utility of manganese dioxide (EMD) and an improvement in hard discharges, this being found to be an advantage especially after storage and, therefore, counteracting cell aging. Due to the fact that, for example, hydrophilic binders are avoided, the electrodes produced according to the invention also do not show swelling of the electrodes after further addition of the aforementioned (KOH) soaking electrolyte, which in any event, ensures straightforward and reliable cell completion in mass production.

The use according to the invention of the graphite dispersion provides excellent compressibility, reduced and less problematic premature electrode swelling (in comparison with hydrophilic binders) and an increase in capacity (in contrast to purely hydrophobic nonconductive binders).

In another variant of the application of the graphite dispersion, smaller amounts thereof are also thinly sprayed onto the already compacted and granulated grains (coating). The advantage of this is that the grains to be compressed subsequently to form the cathode on the one hand, adhere to one another better (increased in breaking strength) and, on the other hand, the bulk grain can flow more easily due to the graphite component (improvement in flowability). Further, increasing the graphite component on the grain surface provides lubrication of the pressing tools. The latter is important especially if, for example, the proportion of graphite in the mass is to be reduced further. For this extra coating process, the ratio between graphite and polymer in the graphite dispersion may be varied according to requirements and the desired effect.

Such a cathode has, for example, the following composition:

89.8% by weight EMD
5% by weight graphite
3.8% by weight KOH solution (50% strength)
1.4% by weight dispersion solution The invention will be explained in more detail with reference to the examples below.

An evaluation was carried out with size LR6 test cells. For this purpose, annular moldings (weight 3.4 g each) with a height of 14.2 mm each and an outer diameter of 13.05 mm and an inner diameter of 8.75 mm were in each case pressed as the positive cathode 3 into a nickel-coated steel cup which was also graphite-coated on the inside.

EXAMPLE 88.15% by weight manganese dioxide
6% by weight graphite
4.5% by weight KOH solution (50% strength)
1.35% by weight dispersion solution of vinyl acetate copolymer

Comparative Example 1
(dry binder):
89% by weight manganese dioxide
6% by weight graphite
4.5% by weight KOH solution (50% strength)
0.5% by weight Sanfresh DK 300 powder

Comparative Example 2
(polyacrylic acid dispersion):
88.50% by weight manganese dioxide
6% by weight graphite
4.5% by weight KOH solution (50% strength)
1% by weight polyacrylic acid dispersion

Comparative Example 3
(polybutyl acrylate dispersion):
88.50% by weight manganese dioxide
6% by weight graphite
4.5% by weight KOH solution (50% strength)
1% by weight polybutyl acrylate dispersion Separator: 2-layer cross winding
Soaking electrolyte 1.3 g: 38% by weight KOH solution
Negative electrode 5.2 g:
65% by weight zinc powder
0.3% by weight carboxymethyl cellulose
0.25% by weight polyacrylate
0.024% by weight indium oxide
34.426% by weight KOH solution (38% strength with 2% by weight ZnO)

The test results of the comparative tests for the various test conditions are summarized in Table 1.

Although this invention has been described in connection with specific forms thereof, it will be appreciated that a wide array of equivalents may be substituted for the specific elements described herein without departing from the spirit

TABLE 1

| | Example Graphite dispersion | Comp. Ex. 1 Dry binder | Comp. Ex. 2 Polyacrylic acid dispersion | Comp. Ex. 3 Polybutyl acrylate dispersion |
|---|---|---|---|---|
| Gassing without discharge [ml] | | | | |
| 7MT | 0.4 | 0.4 | 0.8 | 0.9 |
| MT1 | 0.5 | 0.5 | 2.9 | 2.3 |
| Gassing after discharge [ml] | | | | |
| 7MT | 0.7 | 0.6 | 0.9 | 0.9 |
| MT1 | 1.1 | 0.8 | 2.3 | 2.2 |
| $U_b$-value [V] | | | | |
| NO | 1.447 | 1.440 | 1.448 | 1.421 |
| 7MT | 1.452 | 1.412 | 1.420 | 1.381 |
| MT1 | 1.392 | 1.373 | 1.376 | 1.336 |
| Transistor 43 Ω→0.9 V [Ah] | 2.51 | 2.52 | 2.49 | 2.42 |
| NO Flash 2 Ω→1.0 V [cycles] | | | | |
| No | 565 | 555 | 505 | 501 |
| 7MT | 522 | 513 | 476 | 458 |
| MT1 | 487 | 448 | 422 | 422 |
| Constant discharge 3.9 Ω→0.75 V [Ah] | | | | |
| No | 1.725 | 1.803 | 1.858 | 1.788 |
| 7MT | 1.440 | 1.488 | 1.427 | 1.118 |
| MT1 | 1.208 | 1.229 | 1.144 | 0.830 |
| Constant current discharge 1 A [cycles] | | | | |
| 1.1 V | 0.194 | 0.160 | 0.130 | 0.090 |
| 1.0 V | 0.369 | 0.317 | 0.277 | 0.233 |
| 0.9 V | 0.596 | 0.583 | 0.470 | 0.433 |

What is claimed is:

1. A process for producing a positive electrode containing an organic polymer as binder for primary elements with alkaline electrolytes comprising:

spraying a graphite dispersion which contains an organic polymer on to manganese particles;

forming a rolled strip by compacting resulting sprayed particles;

breaking the strip to form granules; and compressing the resulting mixture to form an electrode body.

2. A process for producing a positive electrode containing an organic polymer as binder for primary elements with alkaline electrolytes comprising:

spraying about 0.5–3% by weight of a graphite dispersion which contains an organic polymer on to manganese particles;

forming a rolled strip by compacting resulting sprayed particles;

breaking the strip to form granules; and compressing the resulting mixture to form an electrode body.

3. The process as claimed in claim 1, wherein the granules are sprayed with a graphite dispersion and compressed to form electrode bodies.

4. The process as claimed in claim 1, wherein manganese dioxide particles are mixed with aqueous KOH solution, compacted to form a rolled strip and subsequently broken to form granules, and the granules are sprayed with a graphite dispersion and compressed to form the electrode bodies.

5. The process as claimed in claim 1, wherein the average particle size of the graphite in the graphite dispersion is about 10 μm.

6. The process as claimed in claim 1, wherein the graphite dispersion contains about 10–50% by weight graphite and about 5–35% by weight organic polymer.

7. The process as claimed in claim 1, wherein an amphiphilic copolymer is used as the organic polymer.

8. The process as claimed in claim 7, wherein a vinyl acetate copolymer is used as the amphiphilic copolymer.

9. The process as claimed in claim 1, wherein an aqueous graphite dispersion is used.

10. The process as claimed in claim 9, wherein about 0.5–3% by weight of the aqueous graphite dispersion is used.

11. The process as claimed in claim 1, wherein the organic polymer is selected from the group consisting of E/VA and VC/VAC.

* * * * *